Oct. 6, 1970   R. W. FOSTER-PEGG   3,531,930
AIR POLLUTION CONTROL DEVICE
Filed July 3, 1968   2 Sheets-Sheet 1

United States Patent Office 3,531,930
Patented Oct. 6, 1970

3,531,930
AIR POLLUTION CONTROL DEVICE
Richard W. Foster-Pegg, Warren, Pa., assignor to Struthers Energy Systems, Inc., a corporation of Delaware
Filed July 3, 1968, Ser. No. 742,358
Claims priority, application Great Britain, July 11, 1967, 31,778/67
Int. Cl. F01n 3/00
U.S. Cl. 60—29          3 Claims

ABSTRACT OF THE DISCLOSURE

An air pollution control device for removing unburned hydrocarbons from the exhaust of an internal combustion engine or from the exhaust of an industrial process, the air pollution control device having a heat exchanger and a combustion chamber, exhaust gases passing through the heat exchanger to be heated and enter the combustion chamber where unburned hydrocarbons are burned further heating the exhaust gases which leave the combustion chamber and pass through the heat exchanger to heat incoming exhaust gases.

BACKGROUND OF THE INVENTION

The major air pollutants exhausted by automobile gasoline engines are unburned hydrocarbons. Present pollution control devices adjust the carburetor and ignition systems to eliminate excess hydrocarbons and they may also inject air into the exhaust manifolds to promote combustion of the unburned hydrocarbons in the exhaust system. These systems tend to deteriorate if an engine is not maintained in peak condition.

SUMMARY OF THE INVENTION

This invention improves the function of air pollution control devices by providing a residence time of the gases at a high temperature. It is understood that there is sufficient air mixed with the exhaust gases to oxidize the unburned hydrocarbons. The residence time is provided in a combustion chamber of relatively large volume and the gases are heated on entering therein by a heat exchanger. After burning in the combustion chamber, the gases pass again through the heat exchanger to heat incoming exhaust gases. While this invention is shown and described for automobile exhaust gases, it will find other applications to remove unburned hydrocarbon pollutants from industrial exhausts.

DESCRIPTION OF THE PREFERRED EMBODIMENT

Figure 1:
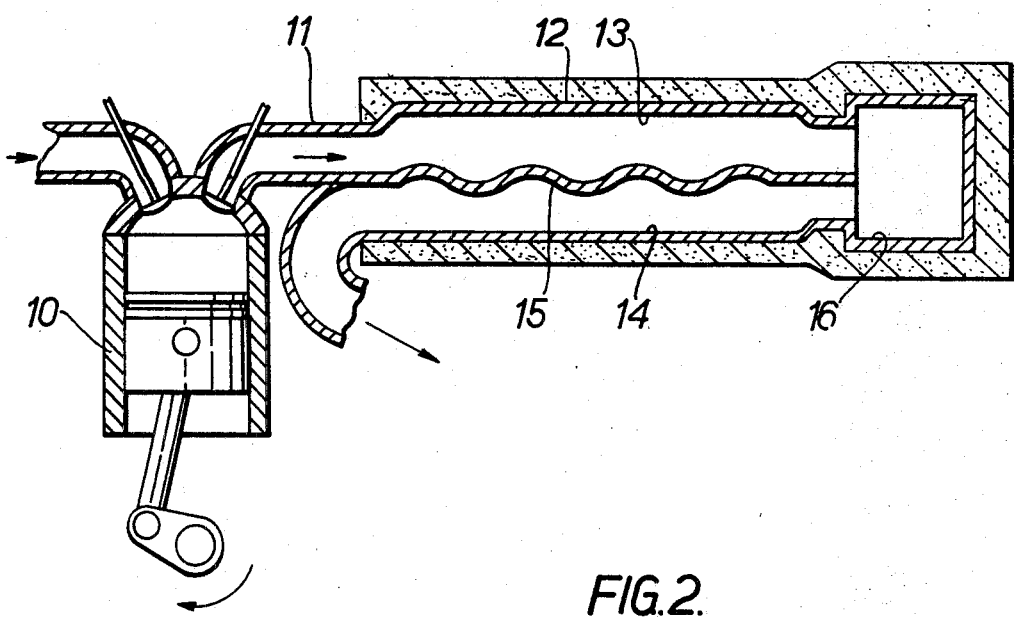
FIG. 1 is a longitudinal vertical section through an internal combustion engine and a first embodiment of my invention.

FIG. 1 shows an internal combustion engine 10 having an exhaust manifold 11. Heat exchanger 12 has an intake passage 13 and an exhaust passage 14 with a heat conducting wall 15 disposed therebetween. Intake passage 13 leads into combustion chamber 16 and exhaust passage 14 leads from combustion chamber 16 to the atmosphere. The heat exchanger 12 and the combustion chamber 16 should be encased with the insulation 17 to prevent heat loss.

Combustion chamber 16 should be of sufficient volume to allow a residence time of over ½ second therein for the exhaust gases when engine 10 is operating normally. As one example, if the temperature of the exhaust gases leaving engine 10 was 1000° F., merely introducing these gases into a combustion chamber 16 would not produce a high enough temperature to burn unburned hydrocarbons. However, if heat exchanger 12 has a thermal ratio of .66, and the combustion temperature rise was 200° F., a temperature of 1600° F. could be obtained in chamber 16. Without heat exchanger 12, a temperature of only 1200° F. could be obtained. This gain in the obtained temperature is explained as follows:

The thermal ratio is the cold stream temperature rise in passage 13 over the maximum temperature difference. Thus, at the hot or combustion chamber end of passage 13 the heat transfer wall 15 is at a temperature of 1500° F. heating incoming exhaust gases from 1000° F. to 1400° F. Combustion in chamber 16 raises these gases to 1600° F. These gases are cooled in passing through passage 14 to below 1200° F.

Figure 2:
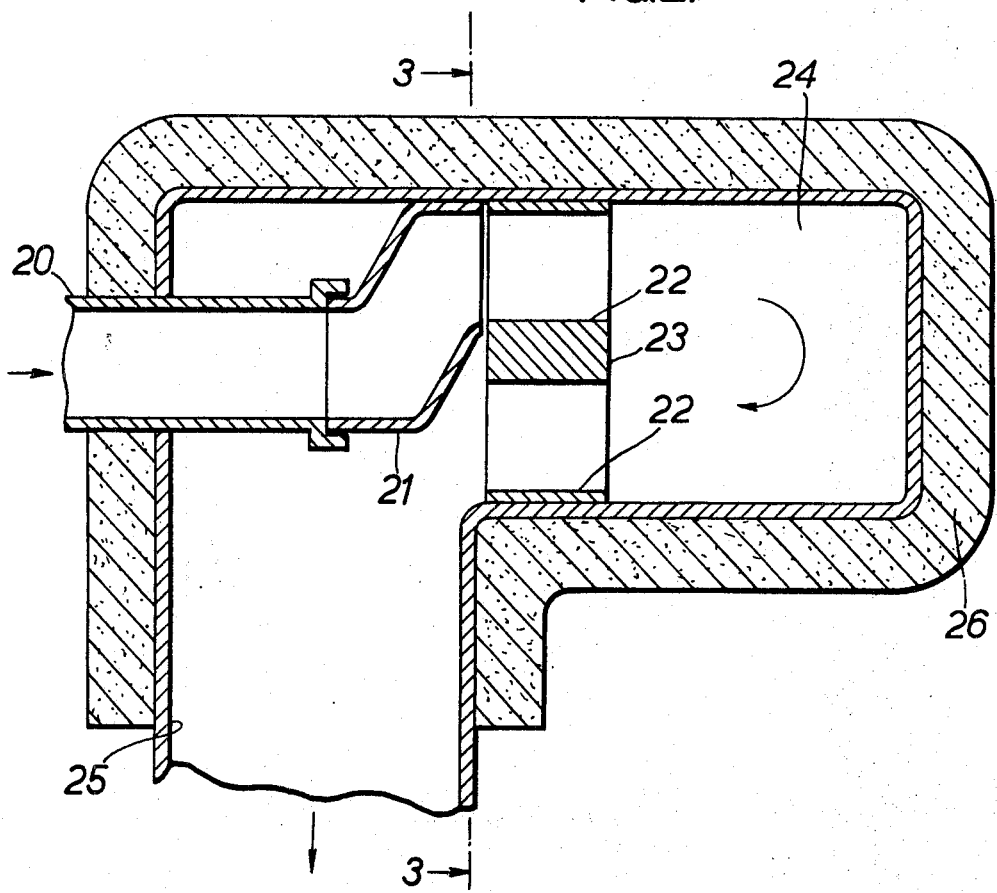
FIG. 2 is a longitudinal section through a second embodiment of my invention.
Figure 3:
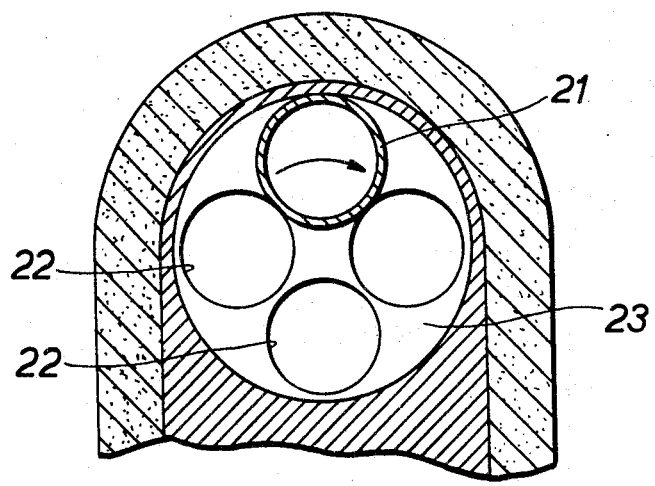
FIG. 3 is a section taken on line 3—3 of FIG.2.

FIGS. 2 and 3 show a rotary heat exchanger applied to the concept of this invention. Exhaust gases from manifold 20 pass through the axially rotating distributor 21 to pass successively through the apertures 22 in heat retaining block 23. Unburned hydrocarbons burn to raise the exhaust gas temperature in combustion chamber 24. These gases pass through apertures 22 to raise their temperature and exit through passage 25. Thus, heat of combustion in chamber 24 is transferred to apertures 22 to heat incoming gases successively distributed by the rotating member 21. The entire device may be covered with a heat insulating material 26 to conserve heat. Distributor 21 may be suitably twisted to be rotated by the passage of gases therethrough or it may be mechanically rotated by any suitable drive means.

Figure 4:
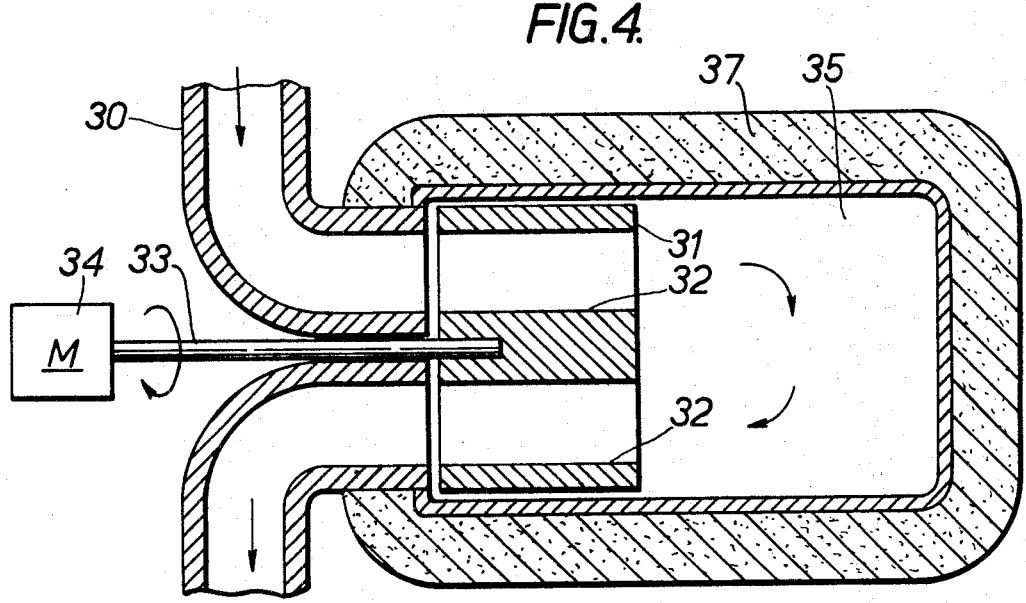
FIG. 4 is a longitudinal section through a third embodiment of this invention.

FIG. 4 shows another type of rotary heat exchanger applied to this invention. Exhaust manifold 30 conducts exhaust gases to a heat retaining block 31 which contains the passage 32. Block 31 is mounted on shift 33 and is rotated by a motor 34 or the like. The gases further burn in combustion chamber 35 and leave through tube 36. The further burned gases heat the rotating block 31 to raise the temperature of the gases entering combustion chamber 35. Insulation 37 is provided.

In all embodiments of this invention, if the exhaust gas temperature is high enough for combustion to be spontaneous, even at a slow and inefficient rate, temperature will build up in the air pollution control device over a short period of time so that the reaction is self-starting and no ignition devices are needed in the combustion chambers.

What is claimed is:

1. An air pollution control device for removing unburned hydrocarbons from hot exhaust, said air pollution control device comprising, in combination, a heat exchanger, and a combustion chamber for burning unburned hydrocarbons therein, said hot exhaust entering and leaving said combustion chamber through said heat exchanger so that said hot exhaust is further heated in said heat exchanger before entering said combustion chamber, said heat exchanger comprising a heat retaining block containing a circular group of longitudinal passages and means successively passing exhaust gases through said passages into said combustion chamber and simultaneously successively passing hot gas from said combustion chamber out through said longitudinal passages to heat said block.

2. The combination according to claim 1 wherein said means is a rotating distributor successively covering and passing hot exhaust through said passages to enter said combution chamber, burn therein, and exhaust from said combustion chamber through the uncovered apertures in said block.

3. The combination according to claim 1 wherein said heat exchanger is rotatably mounted and with the addition of means rotating said block to successively pass through said passages and enter said combustion chamber, and a tube collecting hot exhaust flowing from said combustion chamber through said block, hot exhaust from said manifold being heated while passing through said block into said combustion chamber and hot exhaust being further heated in said combustion chamber by the burning of unburned hydrocarbons, heating said block flowing from said combustion chamber.

References Cited
UNITED STATES PATENTS

| | | | |
|---|---|---|---|
| 2,673,446 | 3/1954 | Salardi | 60—29 |
| 3,086,353 | 4/1963 | Ridgway | 60—29 |
| 3,197,956 | 8/1956 | Clarke | 60—30 |
| 3,302,394 | 2/1967 | Pahnke | 60—30 |

CARLTON R. CROYLE, Primary Examiner

D. HART, Assistant Examiner